May 6, 1969  W. T. LEMEN  3,442,053
AUTOMATIC MEANS FOR PRODUCING A MICROELECTRONIC DEVICE
Filed Nov. 10, 1965

INVENTOR.
William T. Lemen
BY
Robert E. Frazier
ATTORNEY

United States Patent Office 3,442,053
Patented May 6, 1969

3,442,053
AUTOMATIC MEANS FOR PRODUCING A
MICROELECTRONIC DEVICE
William T. Lemen, Frankfort, Ind., assignor to General
Motors Corporation, Detroit, Mich., a corporation of
Delaware
Filed Nov. 10, 1965, Ser. No. 507,155
Int. Cl. B24c 3/00; H01h 47/32
U.S. Cl. 51—8                                              6 Claims

ABSTRACT OF THE DISCLOSURE

The invention relates to means to automatically measure the value of a microelectronic component such as a resistor and, if its value is too low, to erode away by abrasion a portion of the resistance until its value is within proper limits, and lastly to check the same.

*State of the prior art*

Previously others have used an etching electrolyte directed against the surface of a semiconductor body to erode a portion of it away. See Geppert, 2,876,184, issued Mar. 3, 1959. It has likewise been known to monitor the value of a resistance film element applied by vacuum or vapor deposition to a base and to control the amount of such deposition. See Radke, 3,157,535 issued Nov. 17, 1964. Transistorized relay control circuits actuated by a variation in resistance bridge balance are also known. See Cutsogeorge, 2,901,740.

*Description of the invention*

The invention herein relates broadly to means for testing and abrading away resistance material supported on a backing to vary the value of said resistance component in a thin film or integrated circuit form and to automatically bring said component to a desired value. As one example of a device in which such a component or element would be present and could require adjustment during fabrication is a microelectronic automotive voltage regulator which includes a resistive network in integrated circuit form which must be adjusted before the assembly is approved for use. Previously the resistive portion has been abraded by hand to the proper value. The present invention provides an automatic means for the removal of material from such resistance area until its value is within correct limits and then to cut off further abrasive action, and lastly recheck the resistance value.

Figure 1:
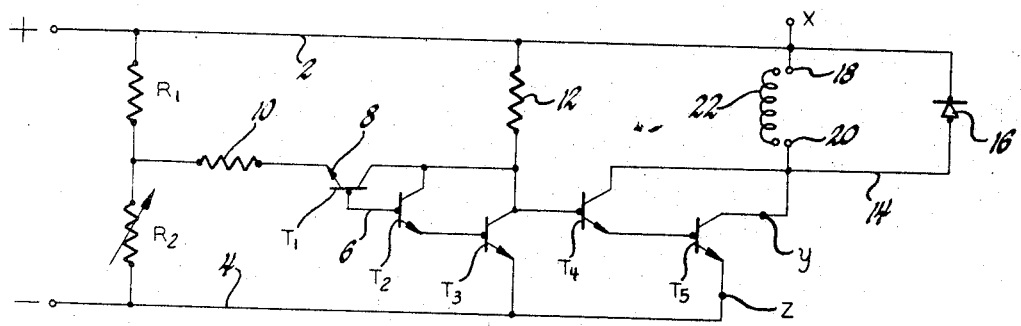
Figure 2:
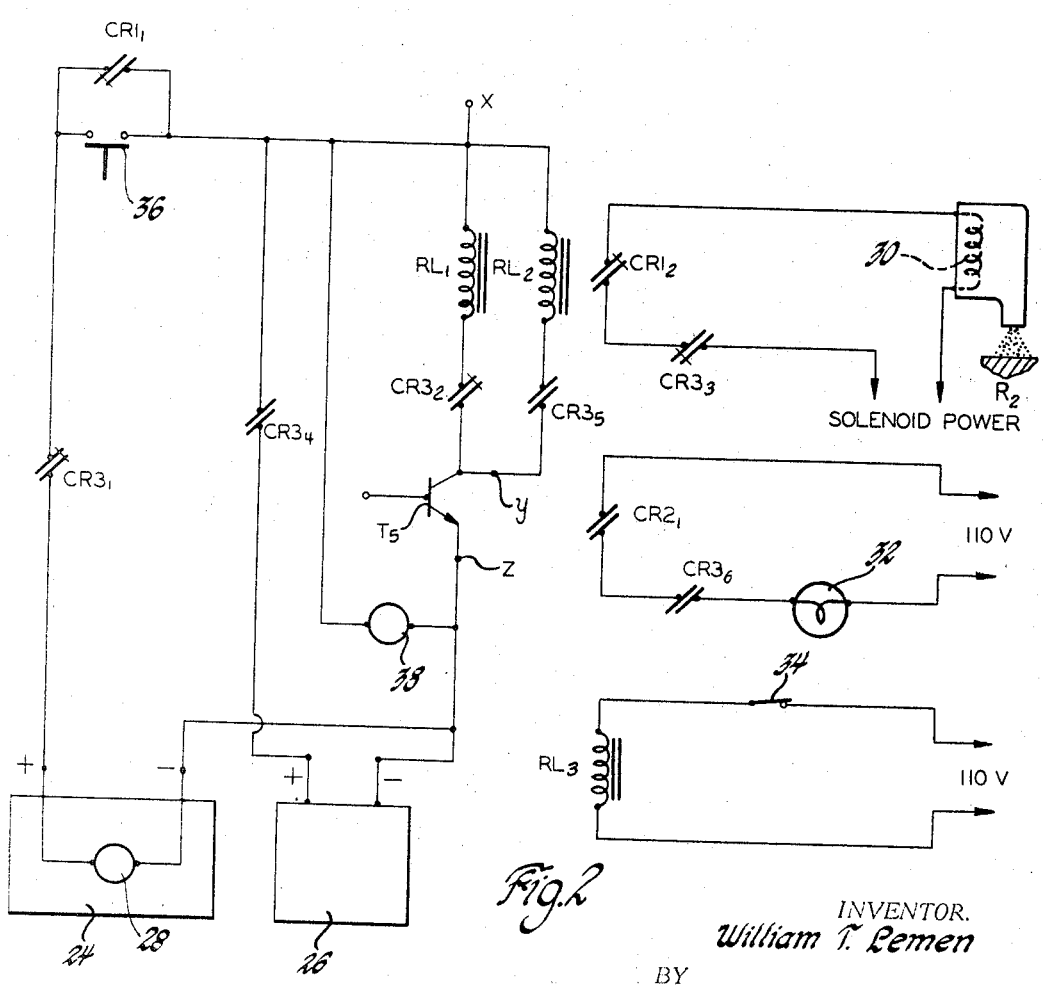

The invention is illustrated in the accompanying drawings in which:

FIGURE 1 is a circuit diagram of a voltage regulator including a resistance that must be adjusted to a correct value; and FIG. 2 is a control and test circuit embodying my invention.

FIGURE 1 is the circuit diagram of a microelectronic voltage regulator. Such a circuit includes a balanced resistive network to determine the voltage of regulation and in the fabrication thereof it is necessary to measure the resistance values and if incorrect adjust the value of one of the resistances until the network reaches a proper balance. In the circuit shown in FIG. 1 resistance $R_2$ is shown as variable and this is the resistance which is adjusted so that the voltage divider consisting of resistors $R_1$ and $R_2$ connected across lines 2 and 4 achieves the proper balance. This determines the voltage which the system maintains. The voltage regulator circuit in this case consists of a plurality of transistors $T_1$, $T_2$, $T_3$, $T_4$, and $T_5$. Transistors $T_2$ through $T_5$, inclusive, are connected in cascade amplifying relation. Transistor $T_1$ operates as a Zener diode and is connected in the input to transistor $T_2$, the two base electrodes of $T_1$ and $T_2$ being interconnected by line 6. Emitter electrode 8 of $T_1$ is connected through resistance 10 with the center point between resistors $R_1$ and $R_2$ in the voltage divider. Line 2 is connected through resistor 12 with the collector electrodes of transistors $T_2$ and $T_3$. Transistor $T_3$ is connected in emitter follower relation with $T_2$, the emitter of $T_2$ being connected to the base electrode of $T_3$. $T_4$ and $T_5$ further amplify the output of $T_3$ in this circuit. The collector electrodes of $T_4$ and $T_5$ are connected to output line 14 and diode 16 is connected across between lines 14 and 2.

The output between these two lines is taken off between terminals 18 and 20 which may be applied to the coil 22 of a relay. If the voltage applied across input terminals plus and minus varies above and below an initial amount, the output of transistor $T_5$ changes to actuate the relay or other means for changing the generator output to either increase and decrease the same depending upon the tendency of the line voltage at that instant. Relay coil 22 could, therefore, actuate switch terminals to switch in or out resistance to change the field current in a generator. Transistor $T_1$ acts as a Zener diode in this case and when the voltage applied thereto from the voltage divider exceeds a certain value the diode breaks down and the current flow changes materially to change the output of the amplifying circuit and thus produce an actuating signal. It is obvious that in order to regulate the applied voltage to a certain predetermined voltage value the balance between $R_1$ and $R_2$ must be accurately initially set. That is the reason why the ratio of $R_1$ to $R_2$ must be determined and changed if necessary. These circuits are currently being used in micro-miniature form utilizing integrated circuitry and thin resistance film depositions so that it is usually necessary to make some adjustment if the formation does not tend to produce an accurate value.

FIGURE 2 discloses a control and test circuit of my invention. This system provides two functions, (1) it sets a point reference voltage and controls the abrasive system; (2) it provides a test voltage and test system. There are two power supplies provided, 24 and 26. Power supply 24 is used to furnish a reference voltage which can be set to a predetermined value. In the assumed example the device which is being adjusted is an automotive voltage regulator, the voltage supply is set at a point of 14.4 volts since that is the voltage it is desired to maintain. This voltage for reference must remain constant. The actual tolerance may be within .05 volt. The meter 28 is of the expanded scale type and gives more accurate readings at the top end of the scale.

With this voltage supply so adjusted the connections of this test circuit are made to the voltage regulator as shown in FIG. 1. Transistor $T_5$ is the transistor $T_5$ of the voltage regulator shown in FIG. 1 and it is connected into the control circuit shown in FIG. 2 and power is supplied to the circuit of FIG. 2 by connecting to points X, Y and Z to the points similarly labelled of FIG. 1 as well as connecting power across the six terminals labelled "110 volt" and "solenoid power." The solenoid power, of course, may be 110 volt but it may also be less depending upon the voltage which is required by the solenoid coil 30 which controls the abrasive feed. There are three control relays utilized by the control circuit which are indicated at $RL_1$, $RL_2$, and $RL_3$. Each of these control relays operate one or more switching contacts which are indicated at $CR1_1$ and $CR1_2$ for those actuated by relay $RL_1$, contacts $CR2_1$ actuated by relay $RL_2$ and contacts $CR3_1$, $CR3_2$, $CR3_3$, $CR3_4$, $CR3_5$ and $CR3_6$ actuated by relay $RL_3$, contacts $CR3_1$, $CR3_2$ and $CR3_3$ being closed and $CR3_4$, $CR3_5$ and $CR3_6$ being opened upon energization of relay coil $RL_3$ as shown by the cross line on the first three named. A second power supply source 26 of variable voltage is utilized and its function will be described later. The three circuits on the right of FIG. 2 are used first, beginning at the top, to control the action of the application of the abrasive material by energization and de-energization of the control solenoid 30. Second, the circuit in the middle controls the energization of an indicating lamp 32, and the lower circuit is the circuit which determines whether the overall system is being used to control the abrasive eroding action or whether it is being used to test the final value of the resistor by the use of the manual switch 34 in series with the relay $RL_3$.

The operation of the control system is as follows. The operator first places the circuit board in position so that resistor $R_2$ is in front of the abrading nozzle (not shown) and connections are made to the voltage regulator at X, Y and Z. When the operator closes switch 34 to energize relay $RL_3$ this action causes contacts $CR3_1$, $CR3_2$ and $CR3_3$ to close and $CR3_4$, $CR3_5$ and $CR3_6$ to open. This places the circuit including control transistor $T_5$ in condition for energization. The operator then momentarily closes manual switch 36 and energizing circuit for relay $RL_1$ is completed as follows. From the positive terminal of reference power supply 24 through $CR3_1$, switch 36, $RL_1$, $CR3_2$, transistor $T_5$ to the negative side of the power supply 24. This energization of $RL_1$ causes it to close its contacts $CR1_1$ bypassing manual switch 36 and, therefore, holding this circuit energized when switch 36 is released. It simultaneously closes contacts $CR1_2$ in the energizing circuit for the solenoid 30. Contacts $CR3_3$ were already closed due to the closure of switch 34. The solenoid 30 is, therefore, energized, allowing abrading material to be directed against the resistance surface of $R_2$ in front of the nozzle eroding it away and thus increasing the value of the resistance for a predetermined time. Resistor $R_2$ which controls the input to transistor $T_5$ is varied in value changing the input to transistor $T_5$.

As the value of $R_2$ increases due to the material removal, the balance of $R_1$, $R_2$ divider combination changes and the regulator circuit described in FIG. 1, which has been set to a given value as shown on meter 28, approaches turn off. When it reaches the proper value the Zener diode formed of the emitter and base electrode of transistor $T_1$ in FIG. 1 breaks down and conducts and transistor $T_5$ turns off. This breaks the circuit through relay coil $RL_1$, shuts off the connection to the power supply 24 and opens the energizing circuit to the solenoid 30 stopping any further abrasive action. At this point any accidental closure of the switch 36 will not have any effect unless the reference voltage 24 is increased, the resistance now having been properly adjusted to regulate to this value.

It is now desired to test the divider to see if the voltage to which it has been adjusted is the correct one. This may be defined as the test check. Switch 34 is now opened, de-energizing relay coil $RL_3$. This opens $CR3_1$, $CR3_2$, and $CR3_3$ and closes $CR3_4$, $CR3_5$, and $CR3_6$. This removes voltage source 24 from the circuit and completes the disabling of solenoid 30. At the same time it connects the test power supply source 26 into the circuit, energizes the test relay $RL_2$ and the light 32 now comes on momentarily to indicate test condition. The power supply 26 is similar to power supply 24 and the meter 38 indicates the voltage supplied. Since the cut off voltage from the voltage divider $R_1$, $R_2$ is now off, $T_5$ may conduct and the relay coil $RL_2$ may be energized. Contact $CR2_1$ is opened when $RL_2$ is energized and lamp 32 goes out therefore only flashing briefly. Since voltage supply 26 is variable it is initially adjusted so that it is always below the normal voltage which would be applied to the resistor $R_2$ at this point. It is then increased until the Zener diode $T_1$ breaks down to again turn transistor $T_5$ off and the meter 38 is read. When $T_5$ turns off the circuit through $RL_2$ is broken and $RL_2$ is de-energized. $CR2_1$ now closes, the indicator light comes on, and the meter is read at this point. The reading should be the same as that of the reference voltage which was applied by power source 24 or within the tolerance voltage of .05 volt if the system and abrasion cycle had operated satisfactorily. It is necessary to use two power supply sources so that the reference voltage 24 need not be changed during the test cycle. The member with the adjusted resistor may then be removed and a new one put in place for measurement and adjustment.

What is claimed is:

1. In means for adjusting the value of composite electronic components whose value may vary on fabrication but which is capable of proper adjustment by removal of surface material by abrasion which component to be adjusted is mounted in front of controllable eroding means to direct abrasive material upon it, the improvement which comprises eroding means for emitting abrasive material, control means for energizing and de-energizing the eroding means to cause the abrasive material to flow, a control relay having an operating coil and a first switching means actuated thereby, said first switching means being connected in circuit with the control means to control the eroding means, a source of electrical power adjustable to a predetermined value dependent upon the desired component value, circuit means connected to the source of electrical power, the relay coil and the component to be adjusted so that the latter forms part of the circuit to the relay coil to control the energization and actuation of the first switching means so that as the value of the component in the control circuit to the relay coil changes as the material is eroded away a balance point will be reached to which the power source has been adjusted and the relay coil will be de-energized opening the first switch to de-energize the eroding means at the given point and stop any further change in value.

2. Means for adjusting the value of composite electronic component parts as defined in claim 1 in which the electronic components are resistors whose value is too low and may be increased by removal of material.

3. Means for adjusting the value of composite electronic components as defined in claim 1 in which the circuit means connected to the source of electrical power and the relay coil and the components include a voltage divider of which the component forms a part and as cascade amplifier circuit which is cut off as the balance change reaches a critical point.

4. Means for adjusting the value of composite electronic components as defined in claim 3 having a further adjustable source of electrical voltage which is set at a low voltage and brought up to a critical voltage, second relay means including a relay operating coil and second switching means controlled thereby, third switching means for disconnecting the first relay coil from the first source of power and connecting the second source of power to the second relay operating coil, a visual indicating circuit including third switching contacts controlled by the third switching means so that after the component has been adjusted to the proper value the third switching means is operated to de-energize the first relay coil and energize the second relay coil to place the visual indicating means in circuit so that it will indicate the value of the second variable voltage source when it reaches the check point.

5. In means for adjusting the value of integrated circuit resistors whose value is lower than required by the circuitry of the integrated circuit of which it is a part, which resistance can be increased by the removal of surface material when placed in front of an abrasive stream from an eroding means, the improvement which comprises an eroding means for emitting an abrasive stream, a control solenoid for the eroding means, a source of electrical power, switching means in series with the source of electrical power and the solenoid to control the operation of the same, a relay coil for operating the switching means, a control circuit for the relay coil including connections to the resistor whose value is to be varied, an adjustable source of electrical voltage connected to said control circuit and adjusted to a value which in combination with the resistance will reach a given amount at the required resistance value, a main control switch in said control circuit normally open and which when closed energizes the relay coil to close the solenoid circuit causing the abrasive material to erode away the resistance material to a point desired at which time the value of the resistance will cause the voltage across the relay coil to decrease and drop out to open its switch contacts causing deenergization of the eroding means and thus adjust the value of the resistance to the proper amount.

6. In means for adjusting the value of integrated circuit resistors whose value is lower than required by the circuitry of the integrated circuit of which it is a part, which resistance can be increased by the removal of surface material when placed in front of an abrasive stream from an eroding means, the improvement which comprises an eroding means for emitting an abrasive stream, a control solenoid for the eroding means, a source of electrical power, switching means in series with the source of electrical power and the solenoid to control the operation of the same, a relay coil for operating the switching means, a control circuit for the relay coil including a voltage divider including a first resistor and the resistor whose value is being varied, said circuit including varied connections to the voltage divider, an adjustable source of electrical voltage connected to said control circuit and adjusted to a value which in combination with the voltage at the divider midpoint will cause the relay coil to be de-energized at the required resistance value, a main control switch in said control circuit normally open and which when closed energizes the relay coil to close the solenoid circuit causing the abrasive material to erode away the resistance material to a point desired at which time the value of the resistance will cause the voltage across the relay coil to decrease and drop to open its switch contacts causing de-energization of the eroding means and thus adjust the value of the resistance to the proper amount, a third adjustable source of electrical voltage, a second relay coil in parallel with the first relay coil, switching means connected in circuit to both the first and second relay coils which when operated will disconnect the first relay coil from the circuit and connect the second relay coil in the circuit, visual indicating means connected to the first source of electrical power, switching means connected to the first source of electrical power, switching means in circuit therewith operated by the second relay coil so that when the resistor has been adjusted to the proper amount and the first relay coil de-energized the second relay coil may be energized and as the third variable voltage is increased from a low value to a given point the indicating means will be energized to indicate that voltage which should be the same as that finally applied across the resistance to check its value.

References Cited

UNITED STATES PATENTS

| | | |
|---|---|---|
| 1,635,184 | 7/1927 | Jones. |
| 2,712,172 | 7/1955 | Bayha _____ 51—8 X |
| 2,773,332 | 12/1956 | Buchman et al. _____ 51—15 |
| 2,876,184 | 3/1959 | Geppert _____ 204—143 |
| 2,901,740 | 8/1959 | Cutsogeorge _____ 340—233 |
| 3,105,288 | 10/1963 | Johnson et al. _____ 51—105 X |
| 3,138,065 | 6/1964 | Owens et al. _____ 51—165 X |

FOREIGN PATENTS 390,476   6/1931   Great Britain.

LESTER M. SWINGLE, *Primary Examiner.*

U.S. Cl. X.R.

317—148.5

U.S. DEPARTMENT OF COMMERCE

PATENT OFFICE

Washington, D.C. 20231

UNITED STATES PATENT OFFICE

CERTIFICATE OF CORRECTION

Patent No. 3,442,053                                        May 6, 1969

William T. Lemen

It is certified that error appears in the above identified patent and that said Letters Patent are hereby corrected as shown below:

Column 4, line 43, "as" should read -- a --. Column 6, lines 8 and 9, cancel "switching means connected to the first source of electrical power,".

Signed and sealed this 21st day of April 1970.

(SEAL)
Attest:

Edward M. Fletcher, Jr.                          WILLIAM E. SCHUYLER, JR.
Attesting Officer                                           Commissioner of Patents